US012768965B2

(12) United States Patent
Park et al.

(10) Patent No.: US 12,768,965 B2
(45) Date of Patent: Oct. 20, 2026

(54) DISTANT LiDAR POSITION CORRECTION SYSTEM AND METHOD USING REFLECTOR

(71) Applicant: AIWORKX Inc., Hwaseong-si (KR)

(72) Inventors: Yeseong Park, Hwaseong-si (KR); Jaemin Lee, Seoul (KR); Jin Suk Lee, Seoul (KR); Suk Won Yoon, Seoul (KR)

(73) Assignee: AIWORKX Inc., Hwaseong-si (KR)

( * ) Notice: Subject to any disclaimer, the term of this patent is extended or adjusted under 35 U.S.C. 154(b) by 402 days.

(21) Appl. No.: 18/388,964

(22) Filed: Nov. 13, 2023

(65) Prior Publication Data

US 2024/0176001 A1 May 30, 2024

(30) Foreign Application Priority Data

Nov. 30, 2022 (KR) ........................ 10-2022-0164917

(51) Int. Cl.
*G01S 7/497* (2006.01)
*G01S 17/87* (2020.01)
*G01S 17/89* (2020.01)

(52) U.S. Cl.
CPC .............. *G01S 7/497* (2013.01); *G01S 17/87* (2013.01); *G01S 17/89* (2013.01)

(58) Field of Classification Search
CPC ........... G01S 7/497; G01S 17/87; G01S 17/89
See application file for complete search history.

(56) References Cited

U.S. PATENT DOCUMENTS

| | | | | |
|---|---|---|---|---|
| 2021/0370968 A1* | 12/2021 | Xiao | G01C 21/3848 | |
| 2022/0390607 A1* | 12/2022 | Du | G01S 17/89 | |
| 2023/0125042 A1* | 4/2023 | D'Ercoli | G06T 7/73 | 382/128 |
| 2023/0196601 A1* | 6/2023 | Habib | G06V 10/80 | 382/100 |

FOREIGN PATENT DOCUMENTS

| | | | |
|---|---|---|---|
| JP | 2021-056017 | A | 4/2021 |
| KR | 10-2021-0022016 | A | 3/2021 |
| KR | 10-2021-0040217 | A | 4/2021 |

* cited by examiner

*Primary Examiner* — Ricky Go
(74) *Attorney, Agent, or Firm* — WHDA, LLP

(57) ABSTRACT

The present invention relates to a method for obtaining and registering vision data from LiDARs. The LiDAR data registration method according to the present invention includes: calculating an external matrix for each LiDAR sensor by using normal vectors for a plurality of first planar objects in point cloud data collected from a plurality of LiDAR sensors; extracting a common second planar object in the point cloud data received from each LiDAR sensor for which correction is performed using the external matrix; and performing registration for the plurality of LiDAR sensors by using the extracted second planar object. According to the present invention, it is possible to generate a depth map for a wider region by precisely registering vision data from LiDARs positioned at a distance.

11 Claims, 9 Drawing Sheets

DISTANT LiDAR POSITION CORRECTION SYSTEM AND METHOD USING REFLECTOR

STATEMENT REGARDING SPONSORED RESEARCH OR DEVELOPMENT

This invention is made with the South Korean government support under grant number S3257603, awarded by Ministry of SMEs and Startups.

CROSS-REFERENCE TO RELATED APPLICATION (S)

This application claims benefit of priority to Korean Patent Application No. 10-2022-0164917 filed on Nov. 30, 2022 in the Korean Intellectual Property Office, the disclosure of which is incorporated herein by reference in its entirety.

BACKGROUND

1. Field

The present invention relates to a method for obtaining vision data from a LiDAR (Light Detection And Ranging). More specifically, the present invention relates to a method for registering vision data from separate LiDARs.

2. Description of Related Art

An existing LiDAR sensor is used in a state of being fixed to a single fixed body or mobile body. The LiDAR sensor is mainly attached to a mobile body and used to recognize or analyze the surroundings. At this time, multiple LiDAR sensors may be used to expand an imaging field of view. With such a system configuration, the LiDAR sensor is mainly used for a surrounding situation recognition technology in the field of automated driving.

As the resolution of the LiDAR sensor has increased, it has become possible to collect high-resolution three-dimensional (3D) information even on a mobile body in real time, but the LiDAR sensor attached to a single device may not measure the entire surface of an object.

A high-resolution LiDAR is mainly used to produce maps. When collecting 3D spatial information, the 3D spatial information is generated by moving the mobile body and continuously accumulating imaging data obtained by the LiDAR sensor.

Since the method of continuously accumulating the imaging data obtained by the LiDAR sensor is not a real-time acquisition method, there is a limitation in that only information of a fixed 3D space may be acquired.

In a case of existing systems developed for automated driving and map production, the LiDAR sensor has limited scalability in applications due to physical limitations.

Patent Document 1 (Korean Patent Laid-Open Publication No. 10-2021-0022016 (Mar. 2, 2021)) proposes a method for precisely obtaining a depth of an image obtained using a reflector by using the image and LiDAR scan data.

SUMMARY

The present invention proposes a method that enables generation of an accurate map of a wider region by using LiDAR.

The present invention proposes a correction method for a LiDAR sensor positioned at a distance by using a reflector having a high-brightness reflective material.

The present invention proposes a method for performing initial positioning and precise position correction by using a plurality of reflectors.

According to an exemplary embodiment of the present invention, a LiDAR data registration method executed in a computing device includes: calculating an external matrix for each LiDAR sensor by using normal vectors for a plurality of first planar objects in point cloud data collected from a plurality of LiDAR sensors; extracting a common second planar object in the point cloud data received from each LiDAR sensor for which correction is performed using the external matrix; and performing registration for the plurality of LiDAR sensors by using the extracted second planar object, in which the first planar object is arranged in each sensing direction of the LiDAR sensor.

The calculating of the external matrix may include: extracting the first planar object by filtering points in the collected point cloud data according to a critical reflection intensity; and calculating the external matrix by using a normal vector for a center point of the extracted points.

The performing of the registration may include calculating a second external matrix for correcting a difference in relative position between the LiDAR sensors by using a common object in second data obtained from the plurality of LiDAR sensors.

At least one of the plurality of LiDAR sensors may be movable, and the external matrix of the LiDAR sensor may be dynamically calculated using normal vectors for plurality of planar objects having different patterns.

In the calculating of the second external matrix, the second external matrix for correcting a difference in relative position caused by movement of the at least one LiDAR sensor may be calculated.

In the calculating of the second external matrix, the difference in relative position caused by the movement may be corrected using a common object among a plurality of planar objects in point cloud data collected from the at least one LiDAR sensor.

The critical reflection intensity may be dynamically determined.

According to an exemplary embodiment of the present invention, a computing device includes: a processor; and a memory communicating with the processor, in which the memory stores commands for causing the processor to perform operations, the operations include an operation of calculating an external matrix for each LiDAR sensor by using normal vectors for a plurality of first planar objects in point cloud data collected from a plurality of LiDAR sensors, an operation of extracting a common second planar object in the point cloud data received from each LiDAR sensor for which correction is performed using the external matrix, and an operation of performing registration for the plurality of LiDAR sensors by using the extracted second planar object, and the first planar object is arranged in each sensing direction of the LiDAR sensor.

The operation of calculating the external matrix may include: an operation of extracting the first planar object by filtering points in the collected point cloud data according to a critical reflection intensity; and an operation of calculating the external matrix by using a normal vector for a center point of the extracted points.

The operation of performing registration may include an operation of calculating a second external matrix for correcting a difference in relative position between the LiDAR sensors by using a common object in second data obtained from the plurality of LiDAR sensors.

At least one of the plurality of LiDAR sensors may be movable, and the external matrix of the LiDAR sensor may be dynamically calculated using normal vectors for plurality of planar objects having different patterns.

In the operation of calculating the second external matrix, the second external matrix for correcting a difference in relative position caused by movement of the at least one LiDAR sensor may be calculated.

In the operation of calculating the second external matrix, the difference in relative position caused by the movement may be corrected using a common object among a plurality of planar objects in point cloud data collected from the at least one LiDAR sensor.

The critical reflection intensity may be dynamically determined.

According to an exemplary embodiment of the present invention, a program stored in a recording medium may include a program code for executing the LiDAR data registration method described above.

DETAILED DESCRIPTION

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

The abovementioned objects, features, and advantages will become more obvious from the following detailed description associated with the accompanying drawings. Therefore, those skilled in the art to which the present invention pertains may easily practice a technical idea of the present invention.

Further, in describing the present invention, when it is decided that a detailed description of the well-known technology associated invention may unnecessarily make the gist of the present invention unclear, it will be omitted.

Hereinafter, various exemplary embodiments of the present invention will be described in detail with reference to the accompanying drawings.

Figure 1:
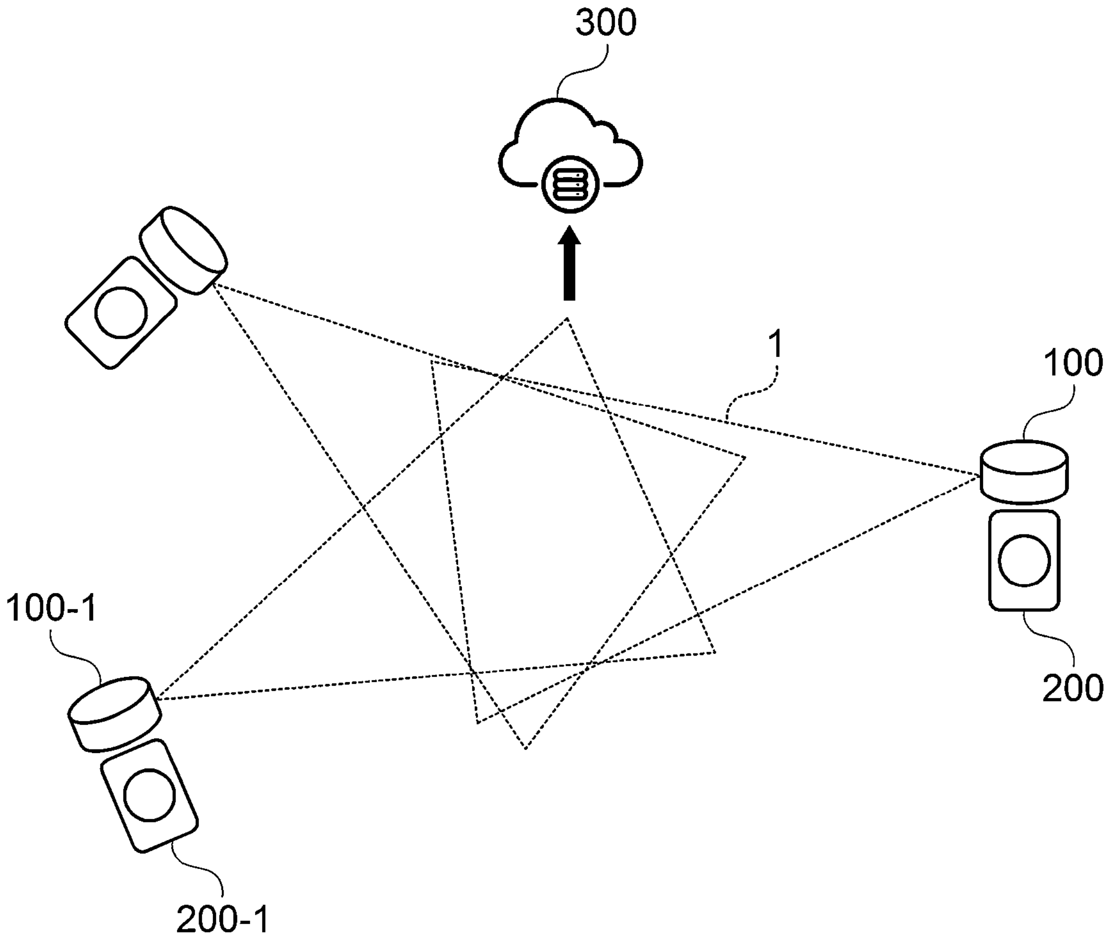
FIG. 1 is a diagram illustrating a sensor system according to an exemplary embodiment of the present invention.

FIG. 1 is a diagram illustrating a sensor system according to an exemplary embodiment of the present invention.

Referring to FIG. 1, the sensor system that executes a registration method according to the present exemplary embodiment may include a plurality of LiDAR (Light Detection And Ranging) systems each including a LiDAR 100 and a reflector 200 as a pair.

A server 300 may register vision data collected from the plurality of LiDARs 100, generate an object detection result, and provide the object detection result to a user.

At this time, the respective LiDARs 100 may collect information regarding a common region 1 at points spaced apart from each other by a predetermined distance, and the collected information may be registered into one vision data and provided to the user.

Specifically, each sensor pair may be positioned in such a way that there are no blind spots in a region to be detected.

Furthermore, in the present exemplary embodiment, vision data may be registered in real time to generate a video for time-series analysis of various objects existing in the region.

In the present exemplary embodiment, the sensor system needs to match coordinates of the LiDARs 100 positioned at a distance in order to collect information regarding moving objects in the region. Further, since an influence of errors caused by unique characteristics or positions of the respective LiDARs 100 may increase as the distance between the LiDARs 100 increases, the sensor system may perform correction therefor.

Therefore, each of the LiDARs 100 used in the present exemplary embodiment may form a pair with the reflector 200, and the sensor system may perform correction by using each reflector 200 to process the collected information of the separate LiDARs.

Hereinafter, a detailed registration method of the sensor system according to the present exemplary embodiment will be described with reference to FIG. 2.

Figure 2:
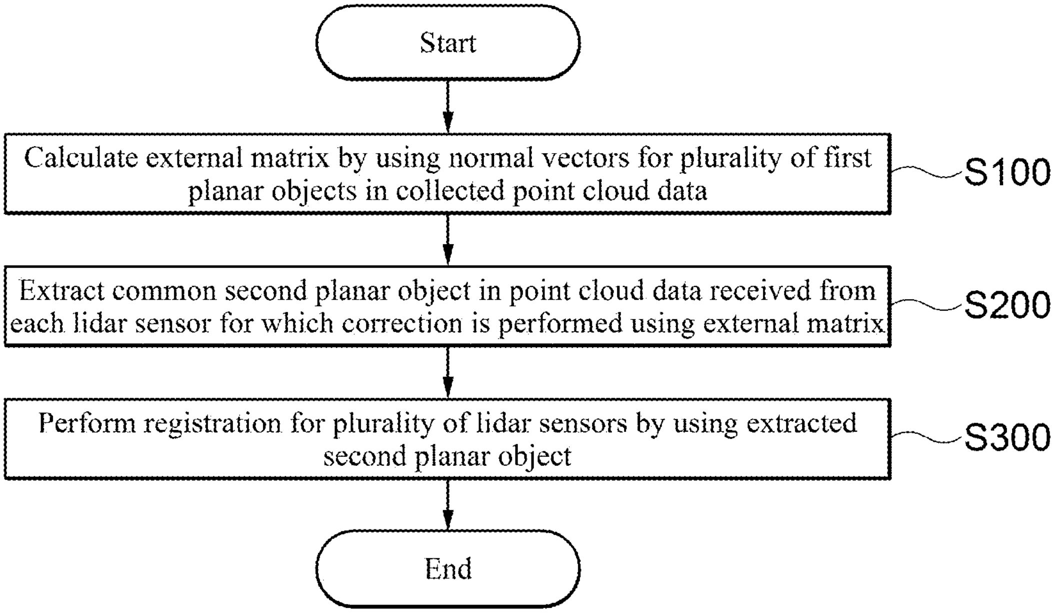
FIG. 2 is a flowchart illustrating the data registration method according to an exemplary embodiment of the present invention.

Referring to FIG. 2, the sensor system according to the present exemplary embodiment may first calculate an initial external matrix for correcting the positions of the LiDARs in the sensor system including the plurality of LiDARs 100 and the reflector 200 (S100).

A registration process using a common object may be difficult due to the characteristics of the LiDARs positioned at a distance, and in a case where an initial external matrix set for each LiDAR is used as is, actual registration may not be possible.

As the distance between the LiDAR sensors for detection positioned at a distance increases, a density of points within an overlapping section decreases, and a difficulty in common plane detection for registration may increase rapidly.

In addition, as the distance between the LiDAR sensors increases, a difference in initial coordinates between the LiDAR sensors increases. Therefore, in a case where registration is attempted in this state, a probability of successful registration may drop sharply.

Therefore, in the present exemplary embodiment, the sensor system calculates the initial external matrix by using the reflector to correct an interval between the LiDARs and the positions of the LiDARs.

Figure 3:
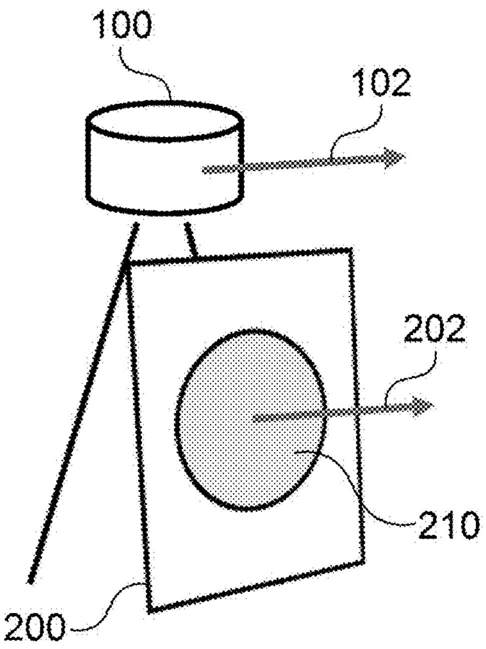
FIGS. 3 and 4 are diagrams illustrating a remote LiDAR registration process according to an exemplary embodiment of the present invention.

Referring to FIG. 3, the sensor system according to the present exemplary embodiment includes the LiDAR sensor 100 and the reflector 200 as a pair, and an imaging direction 102 of the LiDAR 100 and a direction 202 in which the reflector 200 faces may be aligned with each other in the same pair.

The respective LiDARs 100 in the sensor system may indirectly determine relative positions thereof through the reflectors, and a matrix for primary position correction may be calculated by using the relative positions.

Specifically, the external matrix is calculated using a planar object sensed through the reflector of another LiDAR within point cloud data collected by the LiDAR 100.

At this time, the planar object is used to calculate a normal vector for a plane of the reflector, and preferably has a circular shape to thereby facilitate calculation of a center point.

The normal vector for the center point of the planar object positioned in the same direction as the imaging direction of another LiDAR in the sensor system may be extracted from the collected point cloud data and used to calculate the initial external matrix for the LiDARs.

It may be preferable that the planar objects are extracted from the reflectors for two different LiDARs and the respective normal vectors therefor are calculated.

Figure 4:
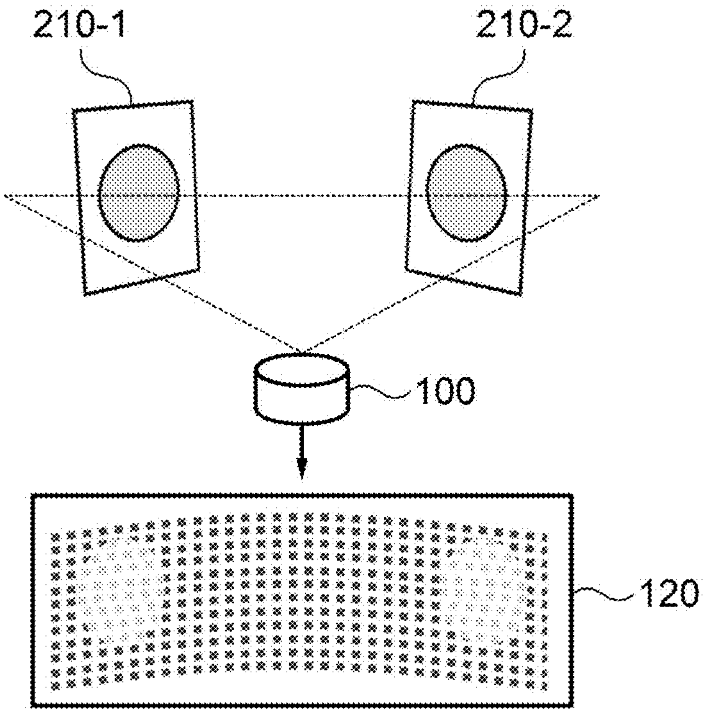

Referring to FIG. 4, in the present exemplary embodiment, planar objects 210-1 and 210-2 in the point cloud data collected by the LiDAR 100 have a higher brightness than other objects because the planar objects 210-1 and 210-2 are formed using a reflective material on the reflectors. As a result, a reflection intensity of the planar objects 210-1 and 210-2 is relatively higher.

Therefore, a shape of the planar object may be identified more easily than that of other objects, and thus, a normal and a center line for the plane may be extracted without a manual labeling process.

Figure 5:
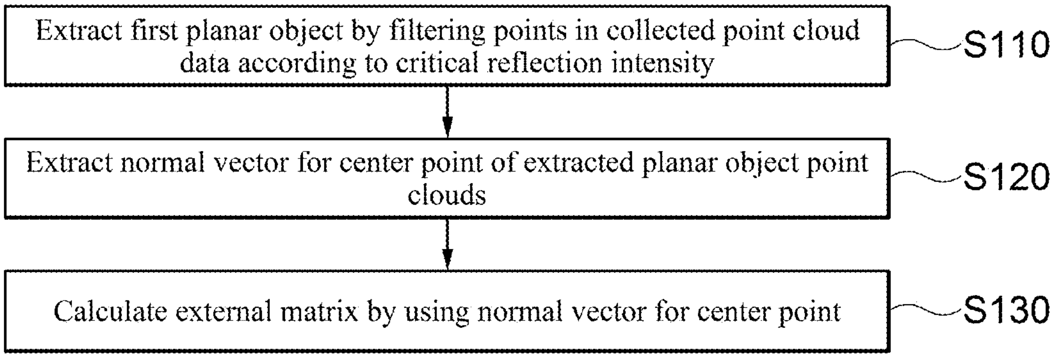
FIG. 5 is a flowchart illustrating an initial external matrix calculation method according to an exemplary embodiment of the present invention.
Figure 6:
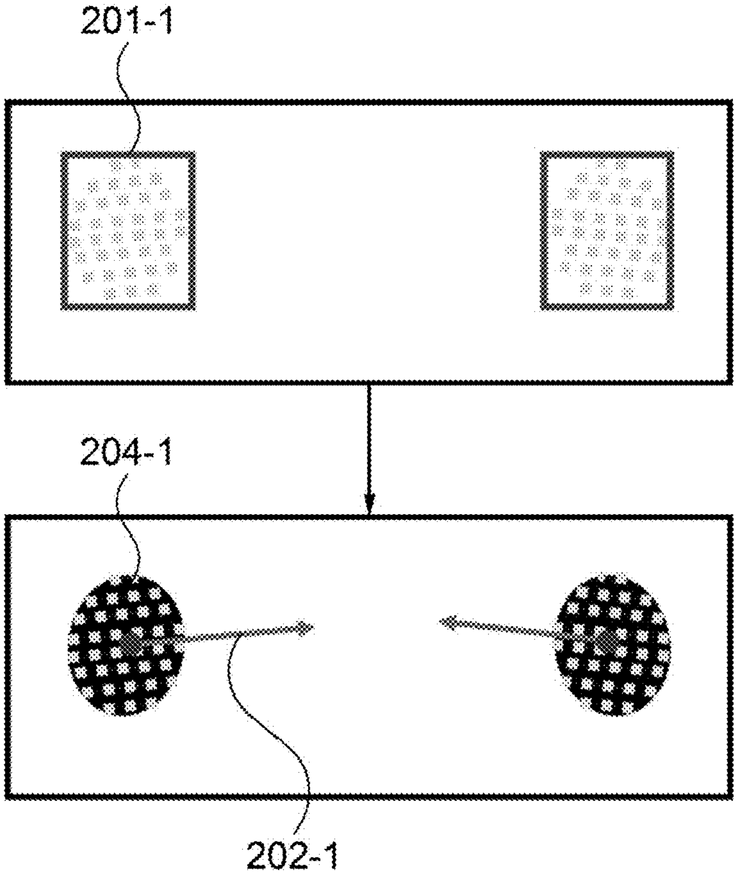
FIGS. 6 and 7 are diagrams illustrating an initial external matrix calculation process according to an exemplary embodiment of the present invention.

A detailed normal vector extraction process will be described with reference to FIGS. 5 and 6.

First, points in the point cloud data collected from the LiDAR 100 are filtered (S110). In the present exemplary embodiment, a filtering condition may be set in advance, and it may be preferable that a region of the planar object is extracted from the point cloud data by performing filtering according to a critical reflection intensity determined according to an expected brightness of the reflective material.

Next, a planar object point cloud having a pattern of the planar object may be extracted from within the region of the planar object in the point cloud data, and a normal vector for the center point of the point cloud may be extracted (S120).

Next, the external matrix may be calculated using the extracted normal vector (S130).

At this time, the external matrix may be calculated using the normal vectors for at least two planar objects as described above.

Figure 7:
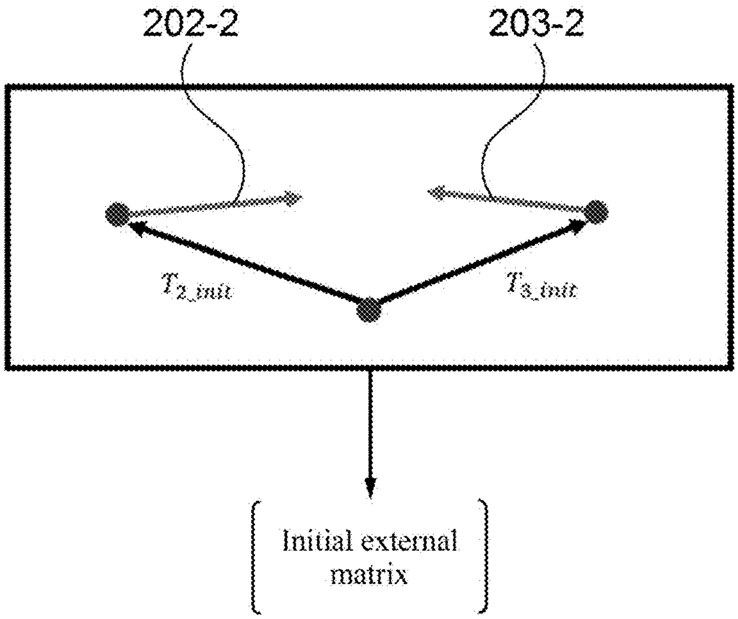

Referring to FIG. 7, the initial external matrix may be calculated based on a relationship between calculated normal vectors 202-2 and 203-2 in the point cloud data and vectors $T_{2\_init}$ and $T_{3\_init}$ for the planar object of the respective LiDARs 100-1 and 100-2 from the center point of the LiDAR 100 and a vector for a preset imaging direction of the LiDAR 100.

Subsequently, the sensor system according to the present invention may perform additional processes for more precise correction.

For precise correction, a common second planar object may be extracted from the point cloud data received from the respective LiDARs corrected according to the external matrix.

Figure 8:
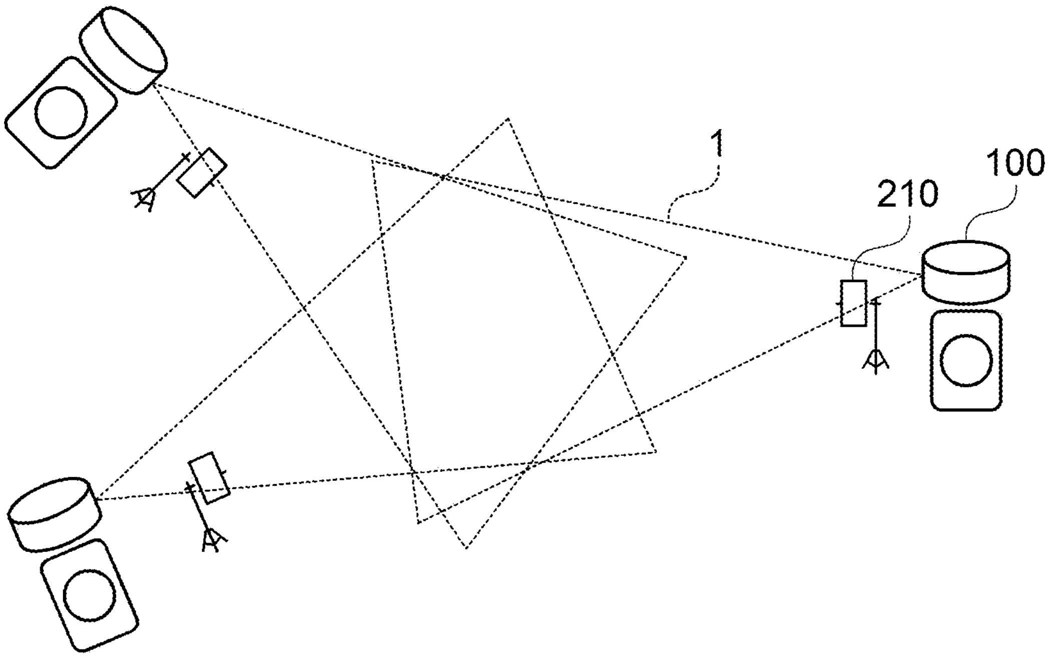
FIGS. 8 to 10 are diagrams illustrating a process of calculating a second external matrix according to an exemplary embodiment of the present invention.

Referring to FIG. 8, the second planar object may be positioned elsewhere or moved, unlike a first planar object aligned according to the imaging direction of the LiDAR for calculation of the initial external matrix.

Here, the second planar object may be commonly recognized within the sensor system, and errors caused by the relative positions of the LiDARs positioned at a distance may be corrected.

Figure 9:
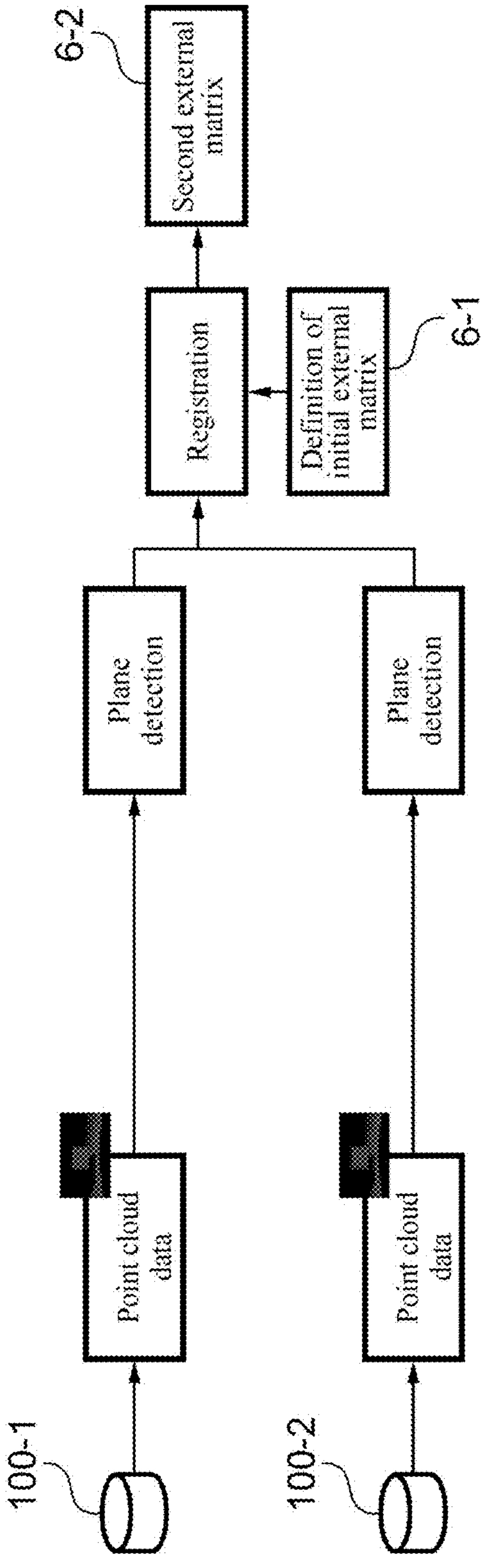

Referring to FIG. 9, in the present exemplary embodiment, the sensor system may calculate a second external matrix for correcting a difference in position between the LiDARs 100 by using a common object in the point cloud data obtained from the plurality of LiDARs 100-1 and 100-2.

In order to calculate the second external matrix, a common plane in the point cloud data of each of the LiDARs 100-1 and 100-2 to which the initial external matrix is applied may be detected, and the difference in position between the LiDARs 100 may be corrected using the common plane by performing iterative registration of common points in the point cloud (Iterative Closest Point (ICP)).

Figure 10:
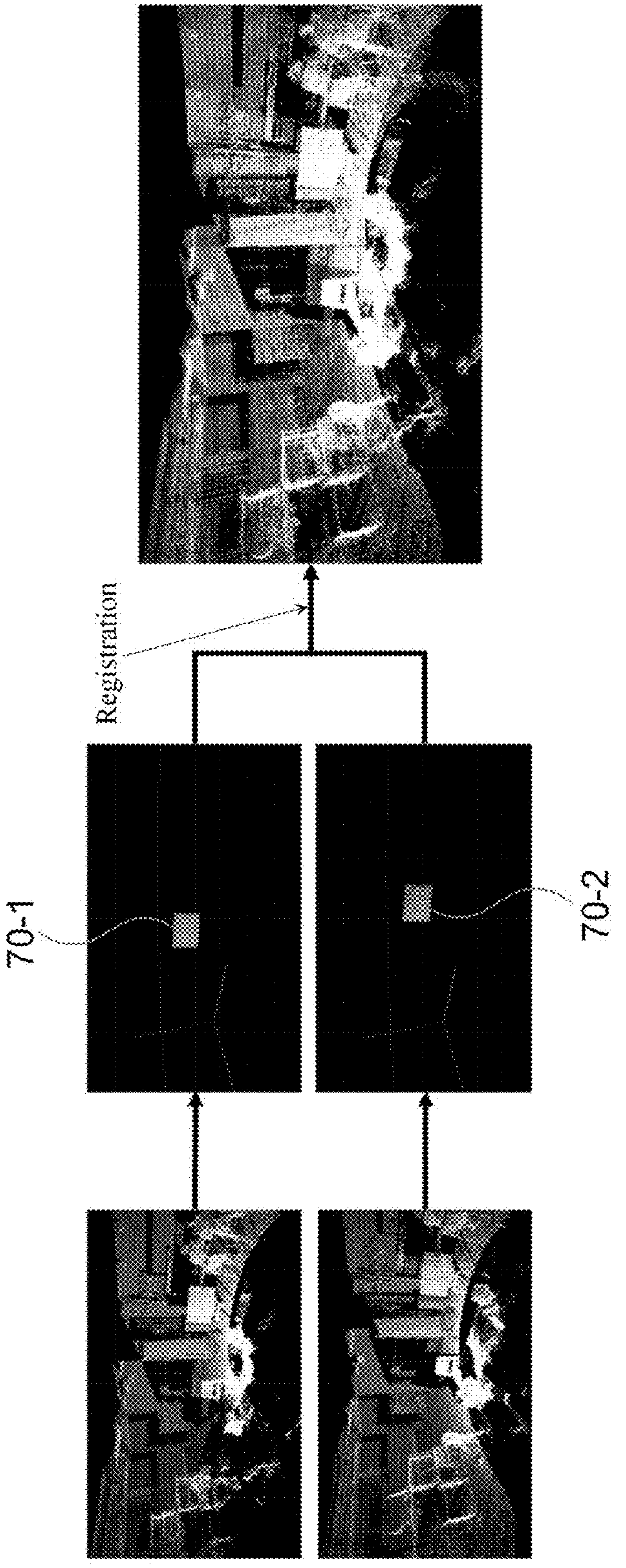
Figure 11:
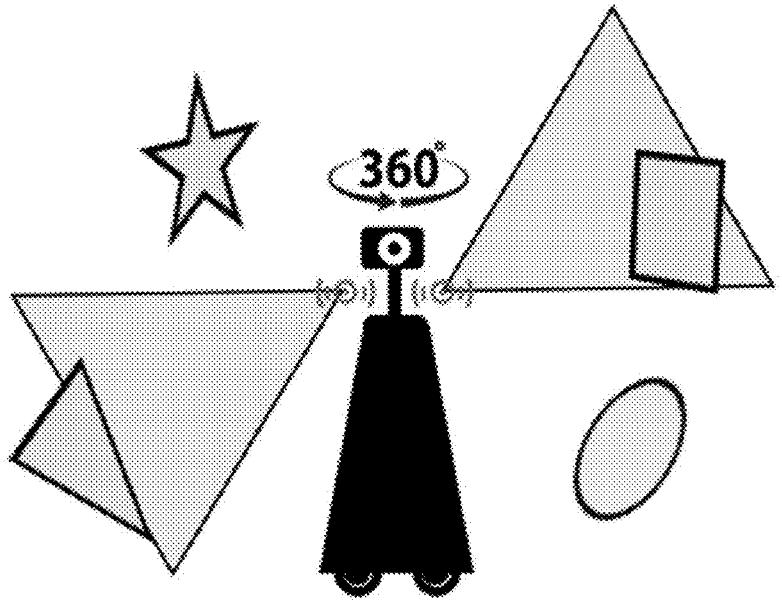
FIG. 11 is a diagram illustrating a single sensor system according to an exemplary embodiment of the present invention.

Referring to FIG. 10, registration for both the LiDARs 100 may be performed through an iterative process of obtaining a relative transform between two point clouds 70-1 and 70-2 with respect to the plane of the second planar object.

Specifically, the second external matrix may be calculated by matching the closest points by using a distance between points in the two point clouds with respect to the common plane and calculating a transform matrix value that minimizes a registration error of the points through iterative computation.

Here, the iterative computation may be performed until the registration error is significantly reduced.

As described above, the sensor system according to the present exemplary embodiment may detect objects in a wider region by using the LiDAR 100 aligned with the reflector 200 and detect motion patterns from real-time vision data.

The server 300 of the sensor system in which registration is performed may detect an exact position of an object as a 3D bounding box with depth information expanded from 2D by using a trained neural network.

Furthermore, the above-described exemplary embodiment may also be applied to a single LiDAR 100, but in this case, the LiDAR 100 may be configured in a movable form instead of a fixed form. In other words, the LiDAR 100 may move for a certain period of time to vision data planar objects with different specific patterns installed at points without blind spots at different points, and the normal vectors for the corresponding planar objects may be used to calculate the initial external matrix according to a sensor position.

Then, the LiDAR for which the correction using the initial external matrix is performed allows the point cloud data of each point to be registered using the second external matrix through another common planar object within an imaging region.

The above-described exemplary embodiment may be applied to an iterative traversing process of a mobile body equipped with the LiDAR to generate a map of a specific region.

Figure 12:
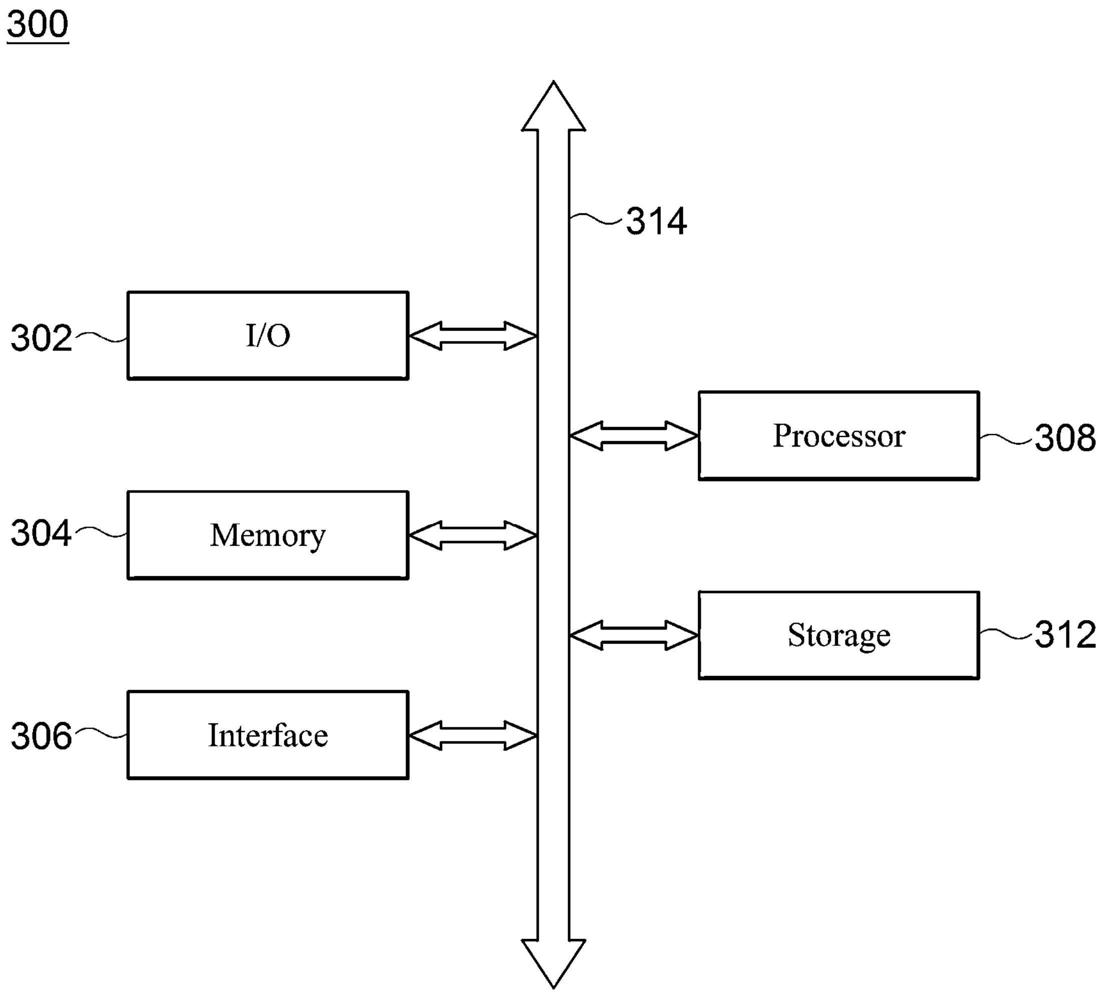
FIG. 12 is a block diagram illustrating a configuration of a computing device according to an exemplary embodiment of the present invention.

Referring to FIG. 12, in some exemplary embodiments of the present invention, the server 300 may be implemented in the form of a computing device. One or more of modules included in the server 300 are implemented on a general-purpose computing processor and thus may include a processor 308, an input/output (I/O) device 302, a memory 340, an interface 306, and a bus 314. The processor 308, the I/O device 302, the memory 340, and/or the interface 306 may be coupled to each other through the bus 314. The bus 314 corresponds to a path through which data are migrated.

Specifically, the processor 308 may include at least one of a central processing unit (CPU), a micro processor unit (MPU), a micro controller unit (MCU), a graphic processing unit (GPU), a microprocessor, a digital signal processor, a microcontroller, and an application processor (AP), or a logic element capable of executing similar functions thereof.

The I/O device 302 may include at least one of a keypad, a keyboard, a touch screen, or a display device. The memory device 340 may store data and/or programs.

The interface 306 may execute a function of transmitting data to or receiving data from a communication network. The interface 306 may be a wired interface or a wireless interface. For example, the interface 306 may include an antenna or a wired or wireless transceiver. The memory 340 may be a volatile operation memory for improving operation of the processor 308 and protecting personal information, and may further include a high-speed dynamic random-access memory (DRAM) and/or static random-access memory (SRAM).

Further, the memory 340 or a storage 312 stores programming and data configurations that provide the functions of some or all of the modules described herein. For example, a logic for performing selected aspects of the above-described training method may be included.

A program or application may be loaded with a set of commands including each step of performing the above-described acquisition method stored in the memory 340, and the processor may perform each step.

Furthermore, various exemplary embodiments described herein may be implemented in a computer-readable recording medium or a recording medium readable by a device similar to a computer by using, for example, software, hardware, or a combination thereof.

According to a hardware implementation, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the present specification may be implemented as a control module itself.

According to a software implementation, exemplary embodiments such as procedures and functions described in the present specification may be implemented as separate software modules. Each of the software modules may perform one or more functions and operations described in the present specification. A software code may be implemented as a software application written in a suitable programming language. The software code may be stored in a memory module and executed by a control module.

According to the present invention, it is possible to generate a depth map for a wider region by precisely registering vision data from LiDARs positioned at a distance.

Further, it is possible to omit a manual label generation process for LiDAR sensor registration.

In addition, it is possible to perform imaging without a blind spot by using the LiDAR sensors positioned at a distance.

The technical spirit of the present invention has been described only by way of example hereinabove, and the present invention may be variously modified, altered, and substituted by those skilled in the art to which the present invention pertains without departing from essential features of the present invention.

Accordingly, the exemplary embodiments disclosed in the present invention and the accompanying drawings are provided in order to describe the technical spirit of the present invention rather than limit the technical spirit of the present invention, and the scope of the present invention is not limited by these exemplary embodiments and the accompanying drawings. The scope of the present disclosure should be interpreted by the following claims and it should be interpreted that all spirits equivalent to the following claims fall within the scope of the present disclosure.

What is claimed is:

1. A distant LiDAR (Light Detection And Ranging) position correction method using a planar object and executed in a computing device, the distant LiDAR position correction method comprising:

calculating an external matrix for each LiDAR sensor by using normal vectors for a plurality of first planar objects in point cloud data collected from a plurality of LiDAR sensors;

extracting a common second planar object in the point cloud data received from each LiDAR sensor for which correction is performed using the external matrix; and performing registration for the plurality of LiDAR sensors by using the extracted second planar object, wherein the first planar object is arranged in each sensing direction of the LiDAR sensor, wherein the calculating of the external matrix includes:

extracting the first planar object by filtering points in the collected point cloud data according to a critical reflection intensity; and calculating the external matrix by using a normal vector for a center point of the extracted points, and wherein the performing of the registration includes calculating a second external matrix for correcting a difference in relative position between the LiDAR sensors by using a common object in second vision data obtained from the plurality of LiDAR sensors.

2. A non-transitory computer-readable recording medium storing a program for executing the distant LiDAR position correction method according to claim 1.

3. The distant LiDAR position correction method of claim 1, wherein at least one of the plurality of LiDAR sensors is movable, and the external matrix of the LiDAR sensor is dynamically calculated using normal vectors for a plurality of planar objects having different patterns.

4. The distant LiDAR position correction method of claim 3, wherein in the calculating of the second external matrix, the second external matrix for correcting a difference in relative position caused by movement of the at least one LiDAR sensor is calculated.

5. The distant LiDAR position correction method of claim 4, wherein in the calculating of the second external matrix, the difference in relative position caused by the movement is corrected using a common object among a plurality of planar objects in point cloud data collected from the at least one LiDAR sensor.

6. The distant LiDAR position correction method of claim 5, wherein the critical reflection intensity is dynamically determined.

7. A computing device comprising:

a processor; and a memory communicating with the processor, wherein the memory stores commands for causing the processor to perform operations, the operations include an operation of calculating an external matrix for each LiDAR sensor by using normal vectors for a plurality of first planar objects in point cloud data collected from a plurality of LiDAR sensors, an operation of extracting a common second planar object in the point cloud data received from each LiDAR sensor for which correction is performed using the external matrix, and an operation of performing registration for the plurality of LiDAR sensors by using the extracted second planar object, and the first planar object is arranged in each sensing direction of the LiDAR sensor, wherein the operation of calculating the external matrix includes:

an operation of extracting the first planar object by filtering points in the collected point cloud data according to a critical reflection intensity; and an operation of calculating the external matrix by using a normal vector for a center point of the extracted points, and wherein the operation of performing registration includes an operation of calculating a second external matrix for correcting a difference in relative position between the LiDAR sensors by using a common object in second vision data obtained from the plurality of LiDAR sensors.

8. The computing device of claim 7, wherein at least one of the plurality of LiDAR sensors is movable, and the external matrix of the LiDAR sensor is dynamically calculated using normal vectors for a plurality of planar objects having different patterns.

9. The computing device of claim 8, wherein in the operation of calculating the second external matrix, the second external matrix for correcting a difference in relative position caused by movement of the at least one LiDAR sensor is calculated.

10. The computing device of claim 9, wherein in the operation of calculating the second external matrix, the difference in relative position caused by the movement is corrected using a common object among a plurality of planar objects in point cloud data collected from the at least one LiDAR sensor.

11. The computing device of claim 10, wherein the critical reflection intensity is dynamically determined.

* * * * *